United States Patent Office 3,573,318
Patented Mar. 30, 1971

3,573,318
NICOTINIC ESTERS OF ACETOPHENONE DERIVATIVES
Giorgio Ferrari, Milan, and Cesare Casagrande, Como, Italy, assignors to Siphar S.A., Lugano, Switzerland
No Drawing. Filed Dec. 6, 1967, Ser. No. 688,340
Claims priority, application Belgium, Dec. 17, 1966, 46,296, Patent 690,791
Int. Cl. C07d 31/36
U.S. Cl. 260—295.5      3 Claims

ABSTRACT OF THE DISCLOSURE

Nicotinic esters of ω,4-dihydroxy-3-methoxy-acetophenone which are useful for the treatment of morbid conditions arising from an increase in capillary fragility, processes for the preparation of the novel esters and pharmaceutical compositions in which the active ingredient is ω,4-dihydroxy-3-methoxy acetophenone or ω,4-mononicotinoyloxy-3-methoxy acetophenone.

---

This invention relates to novel esters of acetophenone derivatives, processes for the preparation thereof and to pharmaceutical compositions containing such compounds.

In the course of their studies of cortical hormones J. von Euw and colleagues isolated, from bovine gland extracts, small quantities of a substance which they called "substance Z" and identified as ω,4-dihydroxy-3-methoxy-acetophenone; they also investigated some of its biological properties (Helv. Chim. Acta 42, (1959), page 1817).

In following the initial studies of this substance, we developed a practical method of synthesis (Chim.e. Ind. (Milano) 43, (1961), page 621) and have undertaken a complete study of its pharmacological activity.

As a result of this study we have now found a group of compounds endowed with a special capillary-protective and also anti-inflammation activity, which are above all advantageous for the treatment of morbid conditions arising from capillary hemorrhages due to an increase in capillary fragility, for example degenerative vasculopathies, allergic states and diabetic vasculopathies.

We have found that ω,4-dihydroxy-3-methoxyacetophenone itself is active in the treatment of the morbid syndromes mentioned above and that these properties are shared by the nicotinoyl esters obtained from this substance.

These esters are furthermore endowed with other specific advantageous properties since they not only have a more extended effect but also are water-soluble in the form of salts and allow better therapeutic results to be obtained since they are coupled to nicotinic acid which, as a result of its role as a vitamin and its vaso-dilatant activity, has been advantageously used in treating troubles caused by an increase in capillary fragility.

In accordance with the present invention there is provided an ester of an acetophenone derivative having the formula:

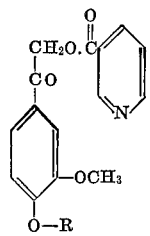

wherein R is a hydrogen or nicotinoyl group or a non-toxic acid addition salt thereof.

Specific esters falling within the above formula are:

ω-Nicotinoyloxy-4-hydroxy-3-methoxyacetophenone, and
ω,4-dinicotinoyloxy-3-methoxyacetophenone.

The present invention also provides processes for the preparation of the above esters, which may be represented by the equation:

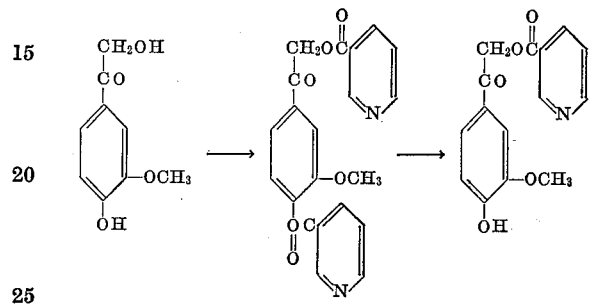

The first step illustrated in the equation comprises the reaction of an appropriate reactive derivative of nicotinic acid (chloride or anhydride) with ω,4-dihydroxy-3-methoxyacetophenone, preferably in an inert solvent and in the presence of a suitable acid acceptor, for example, sodium bicarbonate, potassium carbonate or triethylamine or pyridine. Pyridine is particularly preferred for this purpose since it simultaneously plays the role of a solvent and of an acid acceptor. The first step shown in the equation results in the production of the diester according to this invention.

The next step illustrated in the equation comprises the selective hydrolysis of the diacylated product obtained in the first step to the monoacylated product under suitable conditions, in the presence of an acid or alkaline catalyst.

In a preferred way of practicing the process of the invention ω,4-dinicotinoyloxy-3-methoxyacetophenone is obtained by reaction of ω,4-dihydroxy-3-methoxyacetophenone with the hydrochloride of nicotinic acid chloride in pyridine. The product may be selectively hydrolysed by boiling in a mixture of water and alcohol in the presence of trichloroacetic acid, to give ω-nicotinoyloxy-4-hydroxy-3-methoxyacetophenone.

The present invention further provides a pharmaceutical composition comprising, as the active ingredient, ω,4-(mono- or di-nicotinoyloxy)-3-methoxyacetophenone or a non-toxic acid addition salt thereof, in admixture with a pharmacologically acceptable carrier.

The said non-toxic acid addition salts may be derived from organic or inorganic non-toxic acids. The pharmaceutical compositions of this invention may additionally include other active compounds which may usefully be synergistic with the said active ingredient and may complement its effect.

In forming the pharmaceutical compositions the active ingredients are mixed with excipients or diluents which are non-toxic and appropriate from the point of view of pharmaceutical technique.

Amongst appropriate compositions there may be mentioned tablets, capsules, dragees, solutions and suspensions which are for oral use or are injectable, suppositories, and ointments for topical use.

This invention is illustrated by the following examples:

EXAMPLE 1

ω,4-dinicotinoyloxy-3-methoxyacetophenone 300 g. of the hydrochloride of nicotinic acid chloride are added portionwise to 91 g. of ω,4-dihydroxy-3-methoxyacetophenone in 1500 ml. of pyridine.

After 60 hours at ambient temperature the mixture is poured into water, rendered alkaline with sodium bicarbonate, and the precipitate filtered and well washed with water.

The ω,4 - dinicotinoyloxy - 3 - methoxyacetophenone of melting point 153° to 154° C. is thus obtained.

EXAMPLE 2

ω-Nicotinoyloxy-4-hydroxy-3-methoxyacetophenone 90 g. of ω,4 - dinicotinoyloxy - 3-methoxyacetophenone and 180 g. of trichloracetic acid in 1300 ml. of methyl alcohol and 300 ml. of water are heated to boiling under reflux for 24 hours.

The alcohol is evaporated under reduced pressure, the residue extracted with a sodium bicarbonate solution until neutral, the material filtered, and the product washed by first suspending it in water and then in glacial acetic acid, and crystallised from absolute alcohol.

The ω-nicotinoyloxy-4-hydroxy-3-methoxyacetophenone of melting point 168° to 170° C. is thus obtained.

We claim:
1. A nicotinic ester of an acetophenone derivative having the formula

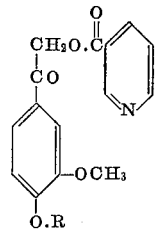

wherein R is selected from the group consisting of hydrogen, a nicotinoyl group and the non-toxic acid addition salts thereof.

2. ω-Nicotinoyloxy-4-hydroxy-3-methoxyacetophenone.
3. ω,4-dinicotinoyloxy-3-methoxyacetophenone.

References Cited

Devitt et al.: Chemical Abstracts, vol. 56, cols., 14, 189–90, June 1962.

ALAN L. ROTMAN, Primary Examiner

U.S. Cl. X.R.

260—247.2, 479, 999

UNITED STATES PATENT OFFICE
CERTIFICATE OF CORRECTION

Patent No. 3,573,318　　　　　　　　Dated March 30, 1971

Inventor(s) Giorgio Ferrari and Cesare Casagrande

It is certified that error appears in the above-identified patent and that said Letters Patent are hereby corrected as shown below:

On the first page, claim for priority should be

-- Dec. 7, 1966 --.

Signed and sealed this 13th day of July 1971.

(SEAL)
Attest:

EDWARD M. FLETCHER, JR.　　　　　　WILLIAM E. SCHUYLER, JR
Attesting Officer　　　　　　　　　　Commissioner of Patents